April 4, 1950
C. C. GARNETT
2,502,714
FISHING POLE CARRIER
Filed July 21, 1947
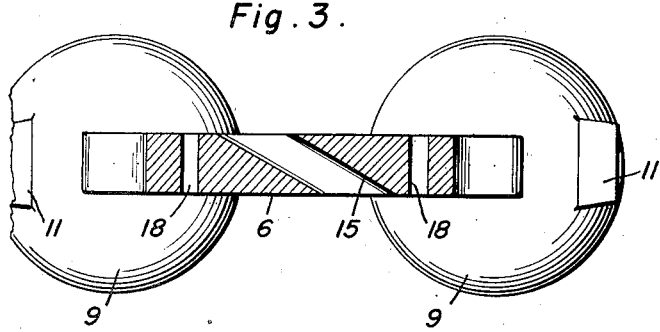
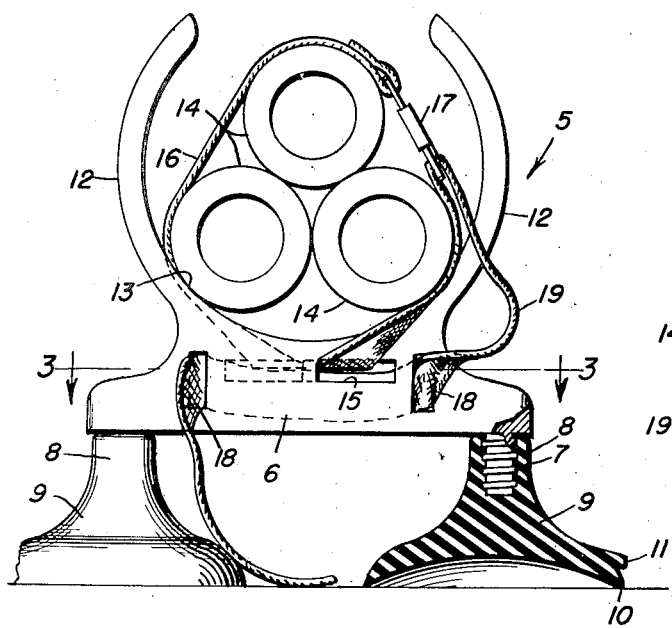
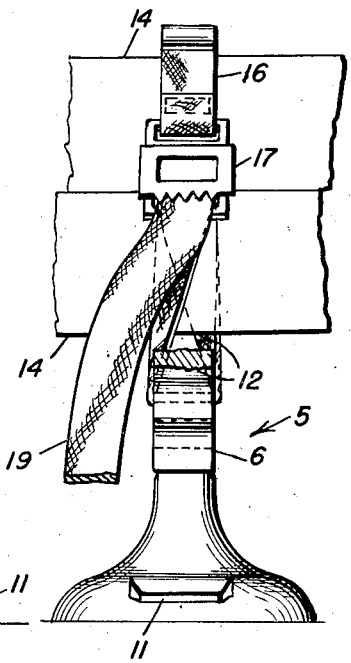
Inventor
Clarence C. Garnett
By Clarence A. O'Brien
and Harvey B. Jacobson
Attorneys

UNITED STATES PATENT OFFICE 2,502,714

FISHING POLE CARRIER

Clarence C. Garnett, Sibley, La., assignor of one-half to Grover C. Powdrill, Minden, La.

Application July 21, 1947, Serial No. 762,356

2 Claims. (Cl. 248—206)

This invention relates to new and useful improvements and structural refinements in fishing pole carriers, more specifically, the fishing pole carrier which constitutes the subject matter of U. S. Patent #2,144,876, which was granted to me on January 24, 1939.

While experimenting with a carrier constructed in accordance with the teachings of this patent, I have found that the same readily lends itself to certain structural and functional improvements, whereby the utility thereof may be considerably enhanced. It is, therefore, the principal object of the invention to provide a device of the character herein described in which such improvements are incorporated.

A further object of the invention is to provide a fishing pole carrier which, like my original invention, is particularly adapted for mounting upon the fenders or the roof of an automotive vehicle.

Another object of the invention is to provide a carrier in which the fishing poles may be quickly and easily installed or removed, yet in which such poles are held firmly while in transportation, so as to eliminate any possibility of the fishing poles coming into contact with the body of the vehicle.

A still further object of the invention is to provide a carrier which is simple in construction, which will easily lend itself to economical manufacture, and which is otherwise well adapted for the purpose for which it is intended.

With the above more important objects in view and such other objects as may become apparent as this specification proceeds, the invention consists essentially of the construction and arrangement of parts as shown in the accompanying drawings in which:

Figure 1 is a front elevational view of the invention, partially broken away to reveal its construction;

Figure 2 is a side elevational view of the subject shown in Figure 1; and

Figure 3 is a cross sectional view, taken substantially in the plane of the line 3—3 in Figure 1.

Like characters of reference are used to designate like parts in the specification and throughout the several views.

Referring now to the accompanying drawings in detail, the invention consists of a fishing pole carrier designated generally by the reference numeral 5, the same embodying in its construction an elongated base 6 which is adapted for mounting in a substantially horizontal position upon the roof or fender of an automotive vehicle, as will be presently described.

The base 6 is provided on the underside thereof with a pair of screw-threaded studs 7 which may be formed integrally with or separately from the base, as desired. The studs 7 project downwardly and each stud is threaded into the nipple-like portion 8 of a conventional vacuum or suction cup 9, as will be clearly apparent.

These cups may be equipped adjacent the mouth or lip edge 10 thereof with a laterally projecting lug or protuberance 11 which constitutes what may be referred to as a finger catch, as it were, whereby the mouth or lip edge portion of the suction cup may be easily and conveniently gripped while the cup is being removed or separated from the surface to which it adheres.

A pair of arcuate arms 12 are formed integrally with and extend upwardly from the mid-portion of the base 6, these arms being disposed in circle-like formation and providing therebetween what may be called a keeper seat 13 for a number of fishing poles 14. It will be noted that the upper ends of the arms 12 are mutually spaced, so as to form a passage whereby the fishing poles may be inserted into the seat.

The essence of the invention resides in the formation of an obliquely disposed slot 15 which extends through the mid-portion of the base 6 from one side to the other, as is best shown in Figure 3. A suitable retaining strap 16 formed from flexible material passes through this slot, one end of the strap being equipped with a buckle 17 while the remaining end portion of the strap passes through this buckle, as will be readily understood. By virtue of the oblique disposition of the slot 15 in the base 6, the strap 16 will be twisted somewhat while encircling the fishing pole, but is will be noted that in that manner, the fishing pole will rest directly upon the inner surfaces of the arms 12 constituting the seat 13, rather than resting upon the retaining strap itself, as was the instance in my original invention. This structural arrangement will result not only in relatively smaller wear of the strap, but will also facilitate the placing of the fishing poles in the carrier before the retaining strap is applied thereto.

The base 6 is also formed on each side of the slot 15 with a pair of transversely extending openings 18, and the free end portion 19 of the strap 16, after passing through the buckle 17, is threaded through these openings, as shown in Figure 1. It should be understood that the free end portion 19 of the strap may be threaded more than once through each of the openings 18, so that the entire length of the strap is expended and the loose end of the strap is prevented from "flapping" against the body of the vehicle.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In a fishing pole carrier, an elongated base provided with spaced and upwardly extending keeper arms, said arms having opposing inner surfaces constituting rests for fishing poles, said base being formed with a slot extending obliquely from one side thereof to the other, and a fishing pole retaining strap extending slidably through said slot.

2. The device as defined in claim 1 wherein said base is formed with a pair of transverse openings disposed adjacent the ends of said slot, an intermediate portion of said strap extending through said slot and a free end portion of the strap being threaded successively through said openings.

CLARENCE C. GARNETT.

REFERENCES CITED

The following references are of record in the file of this patent:

UNITED STATES PATENTS

| Number | Name | Date |
|---|---|---|
| 1,598,559 | Cohen | Aug. 31, 1926 |
| 2,139,849 | Powers | Dec. 13, 1938 |
| 2,144,876 | Garnett | Jan. 24, 1939 |